(12) United States Patent
Garstin et al.

(10) Patent No.: US 7,006,628 B2
(45) Date of Patent: Feb. 28, 2006

(54) EFFICIENT PACKET ENCRYPTION METHOD

(75) Inventors: Mark Garstin, Mississauga (CA); Robert R. Gilman, Broomfield, CO (US); Richard L. Robinson, Broomfield, CO (US); Anwar Siddiqui, New York, NY (US); Mark Wutzke, Drummoyne (AU)

(73) Assignee: Avaya Technology Corp., Basking Ridge, NJ (US)

( * ) Notice: Subject to any disclaimer, the term of this patent is extended or adjusted under 35 U.S.C. 154(b) by 937 days.

(21) Appl. No.: 10/038,295

(22) Filed: Jan. 4, 2002

(65) Prior Publication Data

US 2003/0131233 A1   Jul. 10, 2003

(51) Int. Cl.
*H04L 9/00* (2006.01)
*H04L 9/12* (2006.01)

(52) U.S. Cl. .......................... 380/42; 380/37
(58) Field of Classification Search ............... 380/37, 380/42, 29
See application file for complete search history.

(56) References Cited

U.S. PATENT DOCUMENTS

| | | | |
|---|---|---|---|
| 6,490,354 B1 * | 12/2002 | Venkatesan et al. | 380/43 |
| 6,549,622 B1 * | 4/2003 | Matthews, Jr. | 380/29 |
| 6,862,354 B1 * | 3/2005 | McGrew et al. | 380/42 |
| 2002/0037079 A1 * | 3/2002 | Duval | 380/37 |
| 2002/0044651 A1 * | 4/2002 | Tuvell | 380/37 |
| 2002/0186839 A1 * | 12/2002 | Parker et al. | 380/37 |

OTHER PUBLICATIONS

RSA Laboratories: "RSA Security Response to Weakness in Key Scheduling Algortihm of RC4"; retrieved from Internet URL:www.rsasecurity.com/rsalabs "retrieved on Sep. 13, 2005" The whole document.*

Fluher, Scott, Mantin, Itsik, and Shimir, ADI; "Weaknesses in the Key Scheduling Algorithm of RC4," 2001, http://www.eyetap.org/~rguerra/toronto2001/rc4_ksaproc.pdf, University of Toronto, Toronto, Ontario, Canada.

Stubblefield, Adam, Ioannidis, John, and Rubin, Aviel D., "Using the Fluhrer, Martin, and Sharmir Attack to Break WEP," Aug. 6, 2001, http://www.cs.rice.edu/~astubbie/wep/wep_attack.html, AT&T Labs, Florham Park, NJ.

S.Fluher, I. Mantin, and A. shamir: "Weakness in the Key Scheduling Algorithm of RC4," Retrieved from Internet: URL: www.drizzle.com(aboba/IEEE/rc4_ksaproc.pdf "retrieved on Feb. 26, 2003", pp. 1-23. The whole document.

Kundarewich P D et al; "A CPLD-based RC-4 cracking system"; Electrical and Computer Engineering, 1999 IEEE Canadian Conference on Edmonton, ALTA., Canada, May 9-12, 1999, Piscataway, NJ, USA, IEEE, US, May 9, 1999, pp. 397-402, XP010359797, ISBN: 0-7803-5579-2.

* cited by examiner

*Primary Examiner*—Matthew Smithers
(74) *Attorney, Agent, or Firm*—Patton Boggs LLP

(57) ABSTRACT

The present efficient packet encryption method decreases the computation time to encrypt and decrypt successive packets of plaintext data. An S-vector is generated and the S-vector is used to encrypt successive packets of plaintext, thus reducing the per packet encryption/decryption time. The formula for encrypting successive packets includes use of the packet sequence number with a third variable injected to eliminate the predictability of the variables, thus making the present efficient packet encryption method more secure. A fourth variable is injected into the calculations to generate an encryption stream that does not repeat as frequently to provide additional security from hackers. For encrypting a packet having a long payload of plaintext, a packet byte sequence number is used to generate an encryption stream that is less likely to repeat within a particular packet.

15 Claims, 3 Drawing Sheets

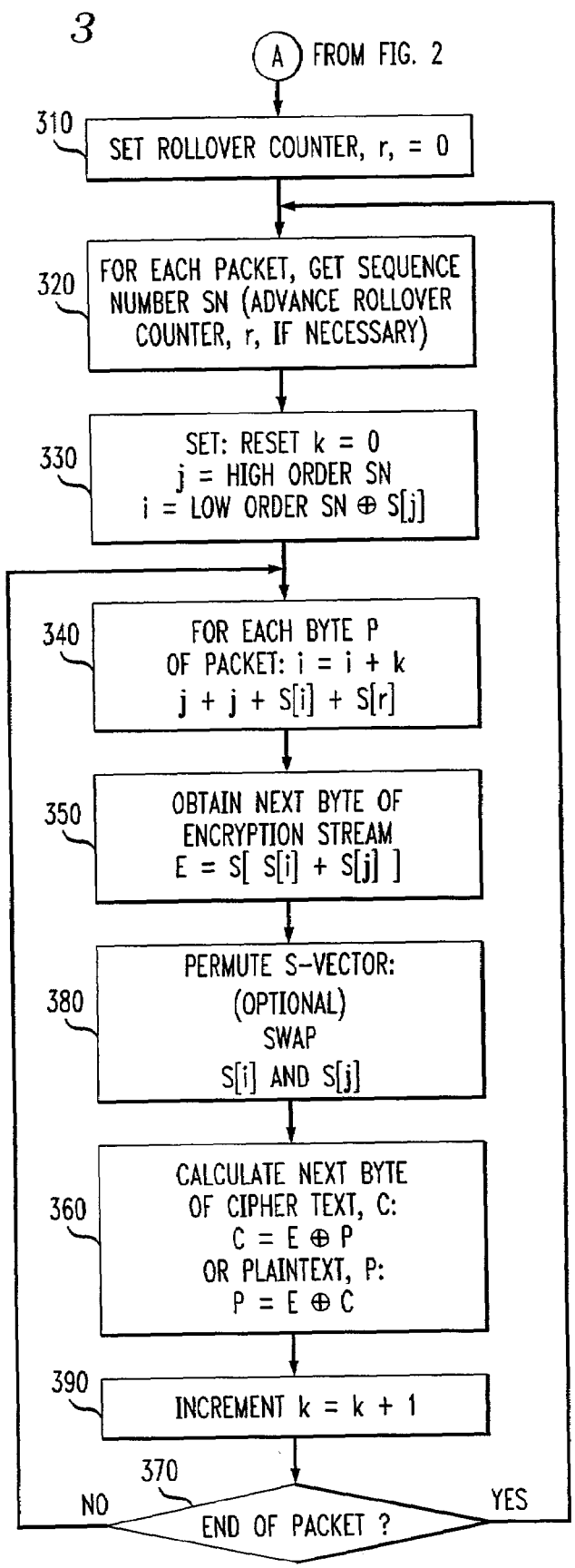

EFFICIENT PACKET ENCRYPTION METHOD

FIELD OF THE INVENTION

The invention relates to telecommunication transmission, and in particular to a computationally efficient packet encryption method for streams of packets that are subject to loss and/or out-of-order delivery during transmission.

PROBLEM

It is a problem in the field of packet transmission to increase the encryption security to prevent unauthorized devices from intercepting and decrypting the transmitted packets while providing a packet encryption method that does not increase the computation time to encrypt and decrypt the plaintext stream. A second problem in the field of packet transmission is to reassemble the sequence of the packets at the destination while providing a packet encryption method that does not require excessive time for the receiver to decrypt and reassemble the packet stream. A third problem is to synchronize decryption of received packets in the presence of lost or out-of-sequence packets.

In packet switching, both wired and wireless, packets of plaintext are sent through the network from a source to a destination. The packets are assembled and disassembled by the Packet Assembler/Disassembler into individual packets of plaintext. Each packet has a unique identification, a sequence number, and each packet comprises three principle elements, a header, a payload and, optionally, a trailer. The header includes control information such as sequence number, synchronizing bits, address of the destination, address of the source, length of the packet, etc. The payload is the plaintext that is being transmitted and the trailer includes an end of packet flag and error detection and correction bits.

For transmission on a packet switched network, a media stream is broken up into "packets". Each packet traverses through the network to the destination through available nodes and is transmitted from node to node as bandwidth becomes available for transmission. At the destination node, an attempt is made to reassemble the packets into the original contiguous stream. Since packets traverse through the network following different routes, packets often arrive at the destination out-of-sequence. Other packets may be lost within the network. Additional processing time is required at the destination to request retransmission of lost packets and/or packets received out-of-sequence and to reassemble the packets into the original contiguous message.

In the field of packet transmission two encryption methods are commonly used, RC4 and Wired Equivalency Privacy (WEP). RC4 is an encryption method supported in Cellular Digital Packet Data (CDPD) and WEP is an encryption method supported by the IEEE 802.11 standard. The Institute of Electrical and Electronic Engineers (IEEE) is the standards making body responsible for many telecommunication and computing standards, including those used in Local Area Networks (LANs), the 802 series of standards. IEEE 802 Part 11b (802.11b) is commonly used for the increasingly popular wireless in building LANs.

WEP and RC4 are "stream" cyphers, at the source they generate a string of random encryption bytes that are all exclusive OR'd with the plaintext bytes to form the ciphertext. Conversely, the ciphertext can be exclusive OR'd with the same encryption stream to restore the plaintext at the destination.

RC4 Encryption Method

RC4 runs from start to finish as a single stream generator, a very long stream generator. RC4 does not use the packet sequence number within the encryption method; instead the sequence of the next bytes of payload plaintext is used. In other words, the encryption/decryption of each byte is dependent on the byte position within the overall stream. RC4 uses a key of up to 256 bytes to generate a 256 byte S-vector that is used to sequentially encrypt each successive byte of payload plaintext. The S-vector algorithm uses two variables, and the S-vector is permuted after each byte is encrypted, thus each encryption stream value is dependent on the number of payload bytes already encrypted or decrypted. Thus, the S-vector evolves over time, making it impractical to resynchronize RC4.

When all of the bytes of payload plaintext have been encrypted, the ciphertext is assembled into packets and a header and trailer is added to each packet for transmission. The problem arises when a packet of data is lost during transmission. The destination knows that a packet has been lost (not yet received) because each header includes a sequence number. If the second packet does not arrive at the destination, the destination is able to decrypt the bytes of payload ciphertext within the first packet. However the destination can not decrypt the third packet that is received because the destination does not know how many bytes of payload ciphertext were transmitted in the missing second packet, thus requiring the destination to request retransmission of all packets not received. This is impractical for real-time media streams. Since all of the bytes of plaintext were converted to ciphertext sequentially, the bytes of ciphertext must be processed in the same order for decryption.

The RC4 encryption method just described fails to provide a method to decrypt subsequent received packets in the event a packet is unrecoverably lost during transmission.

Wired Equivalency Privacy (WEP) Encryption Method

IEEE 802.11b employs the Wired Equivalency Privacy (WEP) method. The similarity between RC4 and WEP is that WEP uses RC4 by reinitializing the method for each packet using the sequence number as a part of the key. The WEP encryption method is reinitialized by rekeying (selecting a new key) and generating a new S-vector using the new key.

To solve the problem created using RC4, WEP uses RC4 with the exception that WEP uses the same incremented S-vector for each packet whereas RC4 used the incremented S-vector for each byte of the payload. By generating a new S-vector for each packet, the destination is able to decrypt each packet in any order received and in the presence of lost packets. In other words, WEP runs from start to finish of one packet, whereas RC4 runs start to finish for each payload stream regardless of the number of packets transmitted for the payload stream. This makes WEP inefficient for small packets like audio communication since a new S-vector has to be computed for each packet.

While the problem of lost packets preventing decryption at the destination is resolved; rekeying and reinitializing the method for each packet is computationally intensive and has been shown to be insecure. It has been demonstrated that there are security flaws in WEP. See Stubblefield, et al., "Using the Fluhrer, Martin, and Shamir attack to break WEP," http://www.cs.rice.edu/~astubble/wep/wep_attack.html and "Weaknesses in the Key Scheduling Method of RC4," http://www.eyetap.org/~rguerra/toronto2001/rc4_ksaproc.pdf. Some PC cards reset the packet sequence number to zero every time they are initialized, and then increment by one for every use. While this method decreases processing time, it results in a high likelihood that keystreams will be reused, leading to simple cryptanalytic attacks against the ciphertext, and decryption of the message traffic. If a hacker is able to break the encryption code for one packet, the hacker can decrypt all of the packets. Another problem with WEP is that it is computationally intensive. The S-vector loop requires 256 steps (for a 256-byte vector) and for each packet the S-vector is recomputed.

RC4 increments the S-vector for each byte in the payload plaintext stream making the RC4 encryption method less computationally intensive at the sacrifice of not being able to quickly recover when a packet is lost within the network. WEP solves the problem by providing a less secure encryption method that is computationally intensive, thus increasing the overhead time required to encrypt the plaintext stream and decrypt the ciphertext stream.

The encryption methods just described fail to provide a method for efficiently encrypting a stream of payload plaintext while allowing the destination to decrypt the received packets if a packet is lost during transmission.

For these reasons, there exists a need for an efficient packet encryption method that does not increase the time required to encrypt the payload plaintext and decrypt the payload ciphertext and that has the ability to recover following loss of a packet or packets arriving out-of-order.

SOLUTION

The present efficient packet encryption method overcomes the problems outlined above and advances the art by providing a method that does not re-compute the S-vector for each packet, thus reducing the time required to encrypt the payload plaintext and decrypt the payload ciphertext. The present efficient packet encryption method also overcomes the problem of lost or out-of-order packets by providing a method that utilizes the packet sequence number to initialize two variables within the encryption method. A third and a fourth variable are injected into the calculation to minimize the predictability of the values used within the encryption calculations and to decrease the frequency at which the encryption stream repeats.

The present efficient packet encryption method utilizes the standard RC4 method to generate an initial S-vector using a secret key. Unlike WEP which generates a new S-vector for each successive packet, the S-vector is generated once for encrypting the entire plaintext stream, thus eliminating the time required to generate a new S-vector for each subsequent packet.

Variable Calculation

Two variables, i and j, are used to produce an encryption stream that is exclusive OR'd with each byte of plaintext within a packet. New values for variables i and j are calculated for successive plaintext bytes within a packet. Unlike RC4 where variables i and j are initially set to zero and are incremented for subsequent plaintext bytes in the payload, after the initial S-vector is generated a starting sequence number is generated for the first packet. A first portion of the sequence number represents variable j and a second portion of the sequence number is used to calculate variable i.

In an embodiment, variable i is calculated by exclusive ORing the second portion of the sequence number with the value of S[j], where S[j] is derived from the S-vector. Injecting a third variable, S[j], into calculating the starting value of variable i eliminates the predictability of variable i, thus making the present efficient packet encryption method more secure from known-plaintext attacks. New starting values of variables i and j are calculated for each subsequent packet. Using the sequence number to generate the encryption stream provides a method for deciphering packets at the destination regardless of the order in which they are received. It also provides a method for deciphering the subsequent packets received after a packet is lost, thus reducing the time to encrypt, transmit, and decipher successive packets of plaintext.

Calculating Successive Encryption and Ciphertext Bytes

If the next successive byte within the packet has not been encrypted, variables i and j are recalculated for each successive byte within the packet. Second variable i is recalculated as the sum of second variable i from the previous iteration plus a fourth variable k, where k is the byte sequence number within the packet payload. At the start of each packet, k reset and k is incremented for each successive byte of plaintext within the packet. Fourth variable k is used in calculating of second variable i to reduce the possibility of parts of the same encryption stream being reused within different packets when the present efficient packet encryption method is utilized to encrypt large payloads of plaintext. First variable j is recalculated as the sum of first variable j from the previous iteration plus third and forth variables S[i] and s[j] respectively, where S[i] and s[j] are derived from the S-vector.

Injecting S[r], into the encryption method generates an encryption stream where the encryption stream does not repeat over a long sequence of packets. Without inclusion of S[r], the encryption stream would repeat approximately every eleven minutes at 100 packets per second. Injecting S[r] into the calculation generates an encryption stream that would repeat every forty-six hours, thus making the present efficient packet encryption method more secure.

In another embodiment the S-vector is permuted during the encryption of each successive packet. In this embodiment, when the S-vector is first calculated, a copy of the S-vector is saved. For each successive byte of plaintext encrypted, the values within the S-vector pointed to by the first variable j and the second variable i are swapped. By swapping the values within the S-vector for each successive byte of plaintext, the S-vector is permuted over time so that the encryption stream generated for long plaintext payloads is less likely to repeat within a packet. When all of the bytes of plaintext within the packet have been encrypted, the initial S-vector is restored for use encrypting or decrypting the next packet.

Calculate First Encryption and Ciphertext Byte

The first byte of the encryption stream is derived from the S-vector using the formula E=S[S[i]+S[j]]. The location within the S-vector that is pointed to by the sum of S[i] and S[j] contains the next byte of the encryption stream. At the transmitter, the next byte of the encryption stream is used to calculate the next byte of the cipher stream. The next byte in the encryption stream is exclusive OR'd (XOR'd) with the next plaintext byte in the packet payload to generate the next ciphertext byte.

At the receiver, the received next ciphertext byte is decrypted by XORing the next received ciphertext byte with the next calculated encryption byte to recover the next plaintext byte. The next step in the present efficient packet encryption method is to determine if the last plaintext byte in the first packet payload has been encrypted.

When all successive plaintext bytes within the next packet have been encrypted, the packet sequence number is incremented and the method loops back to calculate new values for variable i and j from the next successive packet sequence number. The initially generated S-vector is used for all successive packets.

A first advantage of the present efficient packet encryption method is a reduction in per-packet processing time. Using the same S-vector for successive packets reduces the per-packet processing time to encrypt the plaintext stream or decrypt the cyphertext stream, making the present efficient packet encryption method more efficient than previous encryption methods such as the WEP method previously discussed. A second advantage of the present efficient packet encryption method is that it is not subject to the same attack that renders WEP insecure.

A third advantage of the present efficient packet encryption method is that it is designed to easily resynchronize to the packets in the presence of packet loss and/or out-of-sequence packet reception. The present efficient packet encryption method uses each packet sequence number to choose the initial value of variables i and j, and increments the packet sequence number for successive packets. RC4 does not use sequence numbers and the receiver must therefore count bytes from the beginning of the cipher stream, a process that is time consuming and does not recover from loss of a packet.

Using the sequence number to initialize the i and j variables makes the next value of i and j predictable. Injecting a third variable, S[j] when calculating the initial value of variable i eliminates the predictability of determining the values of variables i and j, making the present efficient packet encryption method more secure. Injecting S[r] into the calculation generates an encryption stream in which the packet encryption stream does not repeat as frequently, providing additional security from hackers. Likewise, byte sequence number k is injected to reduce the likelihood that a fragment of the encryption stream will repeat somewhere across a long sequence of packets.

BRIEF DESCRIPTION OF THE DRAWINGS

FIG. 3 illustrates a flow diagram of the present efficient packet encryption method.

DETAILED DESCRIPTION

The efficient packet encryption method summarized above and defined by the enumerated claims may be better understood by referring to the following detailed description, which should be read in conjunction with the accompanying drawings. This detailed description of the preferred embodiment is not intended to limit the enumerated claims, but to serve as a particular example thereof. In addition, the phraseology and terminology employed herein is for the purpose of description, and not of limitation.

In packet switching, both wired and wireless, packets of payload plaintext are transmitted through the network from a source to a destination. The packets are assembled and disassembled by the Packet Assembler/Disassembler into individual packets of payload data. Each packet has a unique identification, a sequence number, and each packet comprises three principle elements, a header, a payload and a trailer. The header includes control information such as sequence number, synchronizing bits, address of the destination, address of the source, length of the packet, etc. The payload is the data or plaintext that is being transmitted and the trailer includes an end of packet flag and error detection and correction bits.

Figure 1:
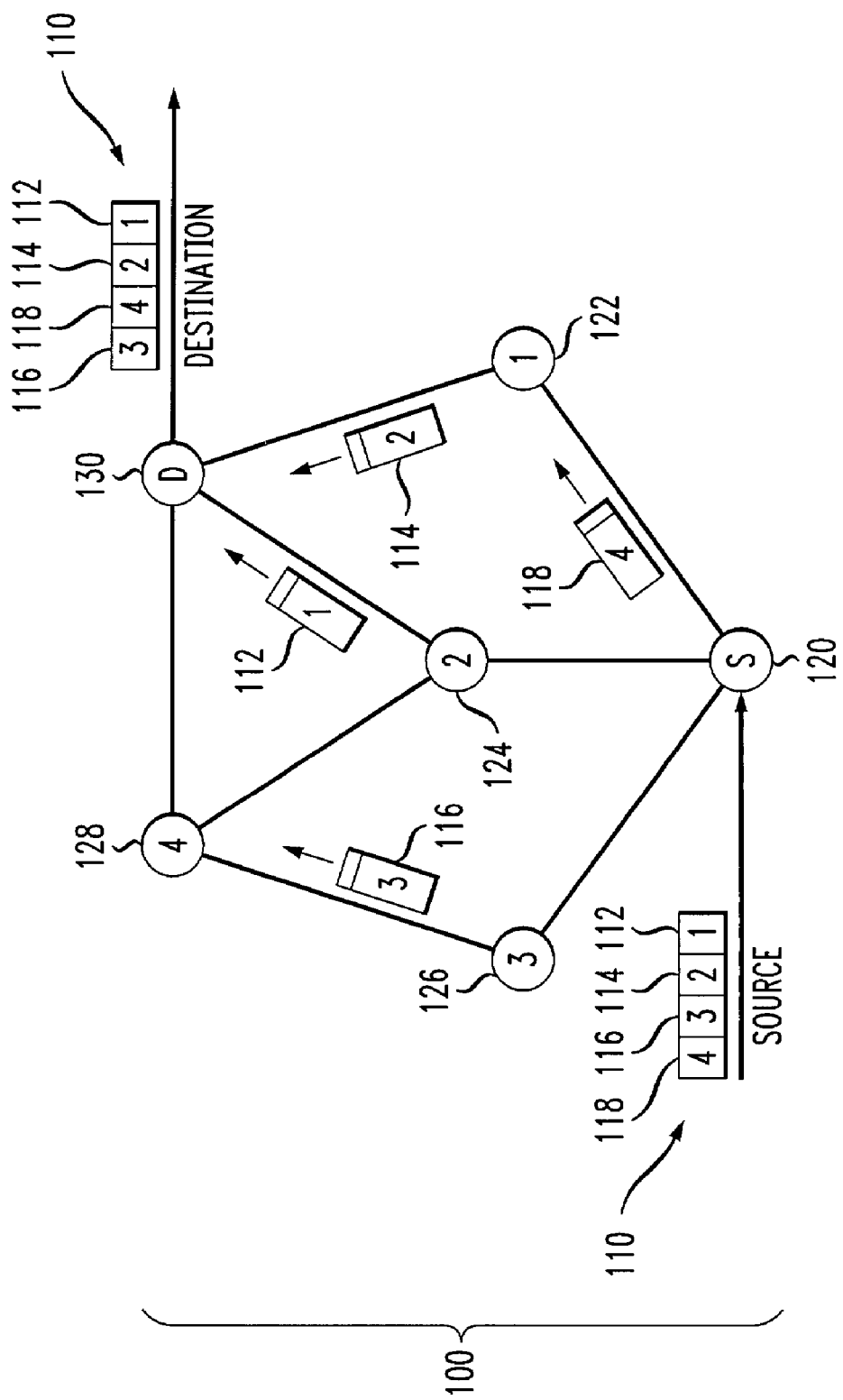
FIG. 1 illustrates a sequence of payload plaintext for transmission over a packet switching network.

Packet Switching—FIG. 1:

Referring to FIG. 1, for transmission on a packet switched network 100, a single message, or stream of data, 110 is broken up into "packets". Each packet 112, 114, 116, and 118, labeled 1 through 4 respectively, traverses through network 100 to the destination through available nodes 120, 122, 124, 126, 128, and 130 and is transmitted from node to node as bandwidth becomes available for transmission. At the destination node 130, packets 112, 114, 116, and 118 are reassembled into the original contiguous message or stream. Since packets traverse through network 100 following different routes, packs often arrive at destination 130 out-of-sequence. Other packets may be lost within the network. Additional processing time is required at the destination to request transmission of lost packets and to reassemble the packets into the original contiguous message. In many cases, retransmission of the lost packets cannot be accomplished in a timely manner, hence the lost packet is unrecoverable.

A main feature of packet switching is the manner in which the transmission links are shared on an as-needed basis. Each packet is transmitted as soon as the appropriate link is available, and no link is held by a source that has nothing to send. After source node 120 transmits the first packet 112, it must follow the same process to send the remaining packets. Each packet may travel a different route between source node 120 and destination node 130 and each packet has a sequence number. The sequence numbers, 1–4 in this example, are used at destination node 130 to reassemble the packets into the original contiguous message 110. For example, first packet 112 moves from source node 120 to first node 122. Second packet 114 leaves source node 120 and moves to first node 122 while first packet 112 moves on to destination node 130, arriving at destination node 130 first and in sequence. As third packet 116 moves from first node 122 to destination node 130, third packet 116 leaves source node 120 and moves to third node 126. The last packet 118 moves from source node 120 to first node 122 while third packet 116 moves to destination node 130. Since the route third packet 116 is traveling is longer than the route last packet 118 is traveling, last packet 118 and third packet 116 may arrive at destination node 130 out-of-sequence.

Similarly, if another node on the network transmits a packet out of turn, the packet may collide with one of the packets being transmitted by source node 120, resulting in a lost packet. Thus, destination node 130 receives three of the four packets. As the processor at destination node 130 reassembles the packets, it realizes that a packet is missing. Using RC4 and WEP encryption methods previously described, destination node 130 would not be able to decrypt packets that are received out-of-order or any packets received after a lost packet.

Encryption schemes fall into two general categories: symmetric encryption systems and asymmetric encryption systems. In symmetric encryption systems, such as those conforming to the Data Encryption Standard (DES), the same key is used by the originator to encrypt the data (i.e., convert the plaintext to ciphertext) and by the recipient to decrypt the same data (i.e., convert ciphertext back to plaintext). The present efficient packet encryption method is symmetric.

Figure 2:
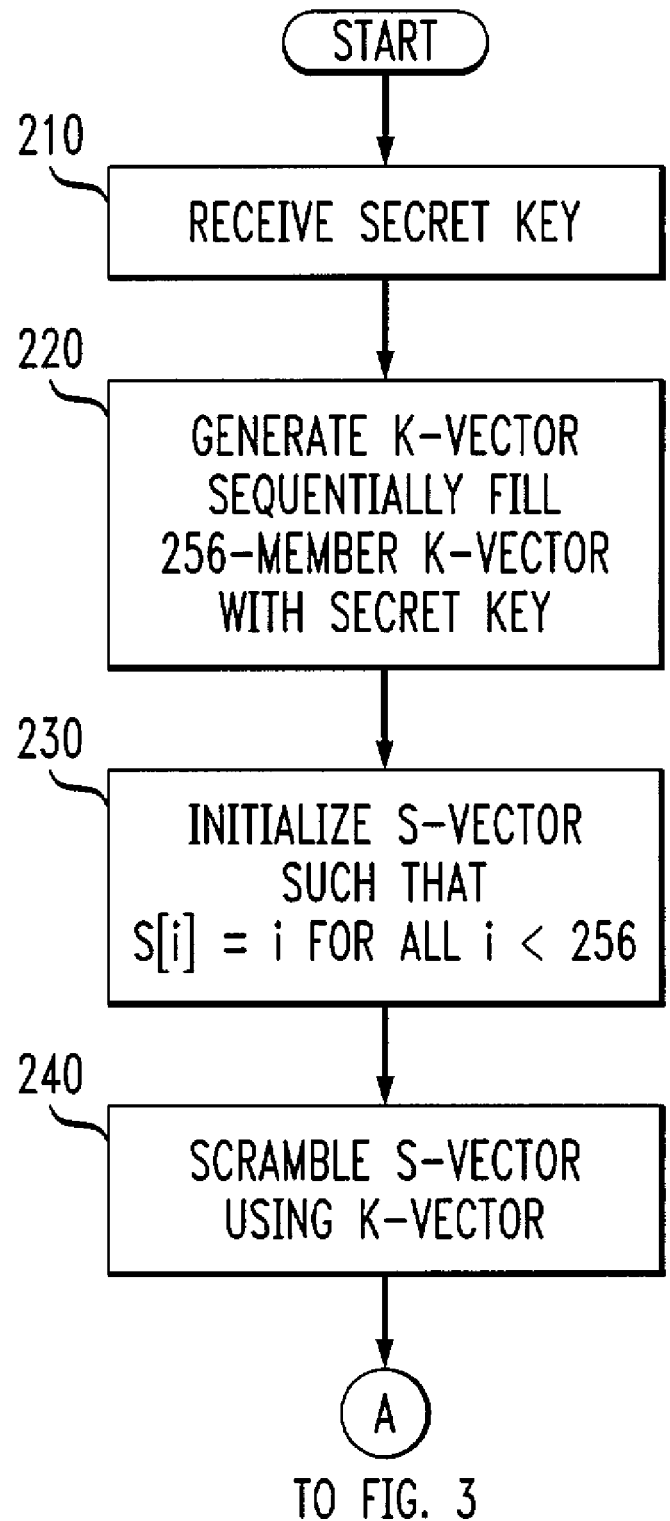
FIG. 2 illustrates a flow diagram of a prior art RC4 method for generating a standard S-vector.

S-Vector Generation—FIG. 2:

The present efficient packet encryption method utilizes the standard RC4 method to generate a starting S-vector. Referring to FIG. 2, the transmitter and receiver agree on a secret key to be used for encryption/decryption of the plaintext in block 210. The transmitter may randomly generate a secret key and transmit the secret key to the receiver in the first packet header or the two devices may agree to use a specific key during call set-up. For purpose of illustration, the present efficient encryption method is described and illustrated comprising a 256-member vector although vectors of other lengths could be substituted.

In block 220, the secret key is repeated, if necessary, to sequentially fill a 256-member K-vector with bytes of the secret key. The value of each byte within the 256-member K-vector is less than 256. In block 230, a 256-member S-vector is initialized such that S[i]=i for all i between 0 and 255. Using the standard RC4 method, the initial S-vector is scrambled in block 240 using the K-vector. All arithmetic operations are carried out modulo 256.

| Step 1 | Receive secret key and generate K-vector using the secret key<br>Initialize an S-vector following standard encryption method such that S[i] = i for all $0 \leq i < 255$<br>Scramble the initial S-vector using the K-vector where<br>j = 0<br>for i = 0 to 255,<br>j = j +S[i] + K[i];<br>swap S[i] and S[j]. |
|---|---| where the values of S[i], S[j] and K[i] are derived from the S-vector and the K-vector. After the initial S-vector has been generated, variables for encrypting packets of plaintext are calculated.

Variable Calculation—FIG. 3:

Variables used for encrypting the packet plaintext are i and j. Unlike RC4 where i and j are initially set to zero and are incremented for subsequent bytes of plaintext within the plaintext stream in the encryption calculation, or the WEP method for which RC4 is reinitialized at the beginning of each packet, the present efficient packet encryption method uses the sequence number to start the encryption process for each packet. The initial sequence number may be a randomly generated sequence number. The sequence number is incremented and the next sequence number is used to encrypt each next packet. Referring to the flow diagram in FIG. 2, the rollover counter, r, is initially reset to zero in block 310 and the initial sequence number is randomly generated in block 320 for the first packet.

| Step 2 | Set initial sequence number (increment sequence number for successive packets)<br>Set initial rollover counter r = 0<br>(Increment r, modulo 256, if sequence number = 0)<br>Reset byte sequence number k = 0 |
|---|---|

The value of rollover counter r is used when calculating a variable, j, used to generate the encryption stream. Likewise, to prevent the same encryption sequence between packets, byte sequence number k is used to calculate variable, i, used in generating the encryption stream.

The sequence number comprises at least two bytes, a low order byte and a next-to-low order byte. If the sequence number is comprised of more than two bytes, the excess high-order part is used, modulo 256, as the rollover counter r. Variable j is initialized to be equal to the high order byte of the sequence number in block 330. Variable i is calculated in block 330 as the exclusive OR of the low order byte of the sequence number with S[j].

| Step 3 | Set variables i and j<br>j = high order sequence number<br>i = (low order sequence number) $\oplus$ S[j] |
|---|---| where S[j] is derived from the previously generated S-vector. Setting the initial value of variables i and j using the sequence number provides a method for reassembling, or synchronizing, the decryption of the packets at the receiver regardless of the order in which the packets are received.

Use of a sequence number alone in the encryption of plaintext packets makes the next value of variables i and j predictable, therefore the encryption method is insecure. Using a known-plaintext attack, once several packets are successfully decrypted, an attacker is able to derive information about elements of the S-vector. Once enough information about S-vector elements is derived using this attack, it is possible to determine the rest of the S-vector and decrypt the ciphertext. Injecting the variable S[j] into the calculation of the initial value of variable i in block 330 decreases the predictability of variable i since the value of S[j] is derived from the S-vector, thus preventing a certain known-plaintext attack against the S-vector. Exclusive ORing the low order sequence number with S[j] insures that any relationship gained from the known-plaintext attack are nonm-linear. Thus, the present efficient packet encryption method is more secure from know-plaintext attacks.

Calculating Successive Packet Variables

To further increase the security of the present efficient packet encryption method, variables i and j are further calculated in block 340 for each subsequent byte of plaintext using a second calculation.

| Step 4 | Calculate variables i and j using<br>i = i + k<br>j = j + S[i] + S[r] |
|---|---| where r is the value of the rollover counter and S[i] and S[r] are derived from the S-vector, and k is the byte sequence number within the packet. As previously discussed, in an embodiment, when the encryption method is initialized, the rollover counter is set to zero in block 320. The rollover counter in this embodiment is incremented when the sequence number increments from all 1s to 0. The sequence number can be substituted for the rollover counter when the encryption method is initialized, and incremented as described above for incrementing the rollover counter.

In an embodiment, second variable i is recalculated as the sum of second variable i from the previous iteration plus a fourth variable k, where k is the packet payload byte sequence number. At the start of each packet, k is reset and k is incremented for each successive byte of plaintext within the packet. Fourth variable k is used in calculating of second variable i to reduce the possibility of portion of the encryption stream being reused in different packets when the present efficient packet encryption method is utilized. First variable j is recalculated as the sum of first variable j from the previous iteration plus third variable S[i] plus forth variable S[r], where S[i] and S[r] are derived from the S-vector. While second variable i could merely be increment by one for each subsequent plaintext byte within the packet, portion of the encryption steam used for pne packet would be reused for some other packets. Thus, using byte sequence number k to recalculate variable i for successive bytes of plaintext within the packet prevents repetition for payloads no longer than $2^{256}$ bytes and thus adds additional security to the present efficient packet encryption method.

Injecting S[r] into the encryption calculation in block 340 and incrementing the value of r in block 320 as necessary for subsequent packets decreases the frequency at which the encryption stream repeats. Without using S[r] in calculating sequential j variables, encrypting 100 packets per second would cause the encryption stream to repeat every eleven minutes, making decryption by a hacker easier. Injecting S[r] into calculating variable j for each byte in the packet and incrementing r as necessary for every next packet, the encryption stream repeats approximately every forty-six hours. Thus, injecting the additional rollover counter variable r into the present efficient packet encryption method provides additional security from hackers.

While calculation of variables i and j have been described using a variable r from a rollover counter or the sequence number directly, other methods of setting the r-value could be substituted. Other known methods for generating an r-value include randomly selecting a starting r value and distributing the r value as a part of the header or the value of r could be derived from a protocol other than RTP. Likewise, alternative methods of updating the counter could be substituted for incrementing the counter when the sequence number increments from a series of all 1s to a series of all 0s. Using the variables i and j generated in block 340, an encryption byte is calculated in block 350.

Calculating First Encryption and Ciphertext Bytes

The first byte of the encryption stream is calculated in block 350 using the values for variables i and j calculated in previous step 4.

| | |
|---|---|
| Step 5 | Calculate next byte in the packet encryption stream using $E[k] = S[S[i] + S[j]]$ | where the binary value of S[i] and S[j] are derived from the S-vector. The location within the S-vector that is pointed to by the sum of S[i] and S[j] contains the next byte of the encryption stream. Using the next byte of the encryption stream, the next byte of the cipher stream is calculated in block 360.

In an optional embodiment the S-vector is permuted, or scrambled, in block 380 during the encryption of each successive packet. In this embodiment, prior to encrypting the first byte of plaintext within the packet, a copy of the S-vector is saved. For each successive byte of plaintext, the value within the S-vector pointed to by the first variable j and the second variable i are swapped. By swapping the values within the S-vector for each successive byte of plaintext, the S-vector is permuted over time so that the encryption stream generated for long plaintext payloads is less likely to repeat within a packet. When all of the bytes of plaintext within the packet have been encrypted, the initial S-vector is restored for use encrypting or decrypting the next packet.

Both the transmitter and the receiver follow steps 1 through 5 to generate the same encryption stream. At the transmitter, the encryption stream is used to generate a ciphertext stream. At the receiver, the stream of ciphertext is received and the encryption stream is used to decipher the ciphertext to recover the plaintext.

| | |
|---|---|
| Step 6 | Transmitter: Calculate next byte ciphertext stream using $C[k] = E \oplus P[k]$ where $P[k] = k^{th}$ byte of plaintext<br>Receiver: Calculate next byte plaintext stream using $P[k] = E \oplus C[k]$ |

Where P[k] is the next byte of plaintext in the packet payload. In step 4, at the transmitter the next byte in the encryption stream is XOR'd with the next plaintext byte in the packet payload to generate a next byte ciphertext.

| | |
|---|---|
| Step 7 | Increment byte sequence<br>$k = k + 1$ |

After the next byte of plaintext has been converted to ciphertext in block 360, byte sequence k is increment by one in block 390. The next step in the present efficient packet encryption method is to determine in decision block 370 whether the last plaintext byte in the first packet payload has been encrypted. If the next byte of plaintext within the packet payload has not been encrypted, the method repeats steps 3–6 for each successive byte of the payload. When all bytes within the payload plaintext stream have been encrypted/decrypted, the method returns to step 2 for the next packet.

The S-vector generated in blocks 230 and 240 is used to compute all variables in blocks 330 through 350 for each payload of plaintext to be transmitted. Unlike WEP where the S-vector is re-calculated for every packet, in the present efficient packet encryption method, the S-vector is not reinitialized for the present stream of payload plaintext; it may be restored if the optional swapping of S-vector elements is implemented. The S-vector is not re-calculated until the transmitter is ready to send a new stream of payload plaintext.

Utilizing the present efficient packet encryption method provides an increased level of security while reducing the computation time to successfully transmit an entire stream of payload plaintext. Eliminating the re-calculation of an S-vector for every packet eliminates the computational steps for generating a new S-vector for each packet.

Using the present efficient packet encryption method does not sacrifice security to save time. Instead, injecting an additional variable in computing variable i, increases the security. Likewise, inclusion of the counter used for calculating variable j further increases the security of the present efficient packet encryption method by generating an encryption stream that repeats less frequently.

As to alternative embodiments, those skilled in the art will appreciate that the present efficient packet encryption method can be generated using a variety of methods for generating the initial sequence number and the initial value for variable r. While the present efficient packet encryption method has been described and illustrated generating a first random sequence number and setting the rollover counter r to zero, alternative methods may be used. Similarly, although the preset efficient packet encryption method has been illustrated and described with a 256-member vector, those skilled in the art will appreciate alternative numbers of members may be substituted.

It is apparent that there has been described an efficient packet encryption method that fully satisfies the objects, aims, and advantages set forth above. While the efficient packet encryption method has been described in conjunction with specific embodiments thereof, it is evident that many alternatives, modifications, and/or variations can be devised by those skilled in the art in light of the foregoing description. Accordingly, this description is intended to embrace all such alternatives, modifications and variations as fall within the spirit and scope of the appended claims.

What is claimed is:

1. A method for encrypting at least one byte of plaintext to produce at least one byte of ciphertext, the method comprising:
   selecting a secret key to create an S-vector following a standard encryption method;
   setting a sequence number, the sequence number having a first part and a second part;
   setting a first variable as the first part of the sequence number;
   setting a second variable as the second part of the sequence number;
   setting a byte sequence number;
   calculating a third variable as the sum of the second variable plus the byte sequence number;
   incrementing the byte sequence number by one;
   calculating a fourth variable by adding the first variable plus the value within the S-vector pointed to by the third variable;
   locating an encryption byte, wherein the location of the encryption byte within the S-vector is pointed to by the sum of the value within the S-vector pointed to by the third variable plus the value within the S-vector pointed to by the fourth variable; and
   exclusive ORing the encryption byte with the at least one byte of plaintext to generate the at least one byte of ciphertext.

2. The method of claim 1 where setting a second variable further comprises:
   exclusive ORing the second part of the sequence number and the value within the S-vector pointed to by the first variable.

3. The method of claim 1, wherein calculating a fourth variable further comprises:
   setting a value for a counter; and
   summing the first variable plus the value within the S-vector pointed to by the third variable plus the value within the S-vector pointed to by the counter.

4. A method of encrypting one or more packets of plaintext, the one or more packets of plaintext having a plurality of bytes of plaintext, the method comprising:
   obtaining a secret key;
   generating an S-vector using the secret key;
   for each successive one or more packets of plaintext,
      obtaining a sequence number having a first portion and a second portion;
      setting a first variable using the first portion of the sequence number;
      setting a second variable using the second portion of the sequence number; and
      setting a byte sequence number equal to zero;
   for each next byte of the plurality of bytes of plaintext, calculating a next encryption byte, the calculating comprising:
      adding the second variable to the byte sequence number to produce a third variable;
      calculating a fourth variable by adding the first variable plus the value within the S-vector pointed to by the third variable;
      locating a next encryption byte within the S-vector by adding the values within the S-vector pointed to by the third variable and the fourth variable to calculate a pointer to locate the next encryption byte;
   setting the second variable equal to the third variable; and
   incrementing the byte sequence number by one.

5. The method of claim 4 wherein calculating a second variable comprises:
   exclusive ORing the second portion of the sequence number with the value within the S-vector pointed to by the first variable.

6. The method of claim 4, at the transmitter further comprising:
   for each next encrypted byte, calculating a next ciphertext byte by XORing the next encryption byte with the next byte of the plurality of bytes of plaintext.

7. The method of claim 4, at the receiver further comprising:
   for each next encryption byte, calculating a received next plaintext byte by XORing the next encryption byte with the next ciphertext byte within each one or more packets of plaintext.

8. The method of claim 4, wherein calculating a fourth variable further comprises:
   setting a counter;
   calculating the fourth variable by adding the first variable plus the values within the S-vector pointed to by the third variable and the counter; and
   for each next one or more packets of plaintext, incrementing the value of the counter according to a predetermined schedule.

9. The method of claim 8, wherein setting a counter further comprises:
   for a first packet of the one or more packets of plaintext, resetting a rollover counter to zero;
   for each next one or more packets of plaintext, incrementing the rollover counter when incrementing the sequence number causes the value of the sequence number to transition from to all 0s.

10. The method of claim 4 further comprising:
    for each next byte of the plurality of bytes of plaintext, permuting the S-vector, the permutation comprising:
       saving a copy of the S-vector; and
       swapping the value within the S-vector pointed to by the third variable and the value within the S-vector pointed to by the fourth variable, wherein the values within the S-vector are swapped after locating the next encryption byte; and
    for each next one or more packets of plaintext, restoring the saved S-vector.

11. A method for converting one or more packets having a plurality of bytes of plaintext P to one or more packets having a plurality of ciphertext bytes C, the method comprising:
    obtaining a secret key;
    calculating an S-vector having a plurality of S-vector bytes using the secret key;
    randomly setting a sequence number having a first part and a second part;

for each successive one or more packets, incrementing the sequence number;

setting a first variable j according to j=first part of the sequence number;

calculating a second variable i according to i=second part of the sequence number;

for each successive byte of the plurality of bytes of plaintext P, calculating a next successive ciphertext byte C, the calculating comprising:

further calculating the first variable according to j=j+S[i];

setting a third variable k;

further calculating the second variable i according to i=i+k;

locating the next successive encryption byte E within the S-vector according to E=S[S[i]+S[j]]; and converting the next successive encryption byte E to a next successive ciphertext byte C according to C=E⊕P; and when the last byte of the plurality of bytes of plaintext P has been converted to ciphertext byte C for the next packet of the one or more packets, transmitting the next successive packet of the one or more packets to a receiver.

12. The method of claim 11 wherein calculating a second variable i further comprises:

exclusive ORing the low order sequence number and the value within the S-vector pointed to by first variable according to i=(low order of the sequence number)⊕S[j].

13. The method of claim 11, wherein further calculating the first variable j further comprises:

setting a counter r;

further calculating the first variable j according to j=j+S[i]+S[r]; and for each successive packet of the one or more packets, incrementing the value of the counter r.

14. The method of claim 11, wherein calculating a next successive encryption byte E further comprising:

permuting the S-vector, the permutation comprising:

saving a copy of the S-vector; and swapping the byte of the plurality of S-vector bytes pointed to by the first variable j and the byte of the plurality of S-vector bytes pointed to by the second variable i; and when the last byte of the plurality of bytes of plaintext P has been converted to the plurality of ciphertext bytes C for the next one of the one or more packets, restoring the saved S-vector.

15. A method for converting one or more packets having a plurality of bytes of plaintext P to one or more packets having a plurality of ciphertext bytes C, the method comprising:

obtaining a secret key;

calculating an S-vector having a plurality of S-vector bytes using the secret key;

randomly setting a sequence number having a high order and a low order;

for each successive one or more packets, incrementing the sequence number;

for each successive byte of the plurality of bytes of plaintext P, calculating a next successive encryption byte E, the calculating comprising:

setting a first variable j according to j=high order of the sequence number;

calculating a second variable i according to i=(low order of the sequence number)⊕S[j];

setting a counter r;

further calculating the first variable according to j=j+S[i]+S[r];

setting a third variable k;

incrementing the second variable i according to i=i+k;

locating the next successive encryption byte E within the S-vector according to E=S[S[i]+S[j]]; and converting the next successive encryption byte E to a next successive ciphertext byte C according to C=E⊕P; and when the last byte of the plurality of bytes of plaintext P has been converted to ciphertext byte C for the next packet of the one or more packets, transmitting the next successive packet of the one or more packets to a receiver.

* * * * *